United States Patent
Uhm et al.

(10) Patent No.: US 11,978,911 B2
(45) Date of Patent: May 7, 2024

(54) THREE-DIMENSIONAL STRUCTURE ELECTRODE AND ELECTROCHEMICAL ELEMENT INCLUDING SAME

(71) Applicants: UNIST (Ulsan National Institute of Science and Technology), Ulsan (KR); LG Energy Solution, Ltd., Seoul (KR)

(72) Inventors: In Sung Uhm, Daejeon (KR); Sang Young Lee, Busan (KR); Yo Han Kwon, Daejeon (KR); Ju Myung Kim, Gangwon-Do (KR); Joon Won Lim, Daejeon (KR); Jae Hyun Lee, Daejeon (KR); Je Young Kim, Daejeon (KR); Seong Hyeok Kim, Ulsan (KR)

(73) Assignees: UNIST (Ulsan National Institute of Science and Technology), Ulsan (KR); LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/954,856

(22) Filed: Sep. 28, 2022

(65) Prior Publication Data
US 2023/0028893 A1 Jan. 26, 2023

Related U.S. Application Data (62) Division of application No. 16/959,860, filed as application No. PCT/KR2019/013610 on Oct. 16, 2019, now Pat. No. 11,495,802.

(30) Foreign Application Priority Data

Oct. 18, 2018 (KR) .................. 10-2018-0124498

(51) Int. Cl.
*H01M 4/66* (2006.01)
*H01M 4/04* (2006.01)
(Continued)

(52) U.S. Cl.
CPC ......... *H01M 4/668* (2013.01); *H01M 4/0435* (2013.01); *H01M 4/139* (2013.01);
(Continued)

(58) Field of Classification Search
CPC .......... H01M 4/04; H01M 4/668; H01M 4/66; H01M 4/13; H01M 4/139; H01M 4/74; H01M 10/0525
See application file for complete search history.

(56) References Cited

U.S. PATENT DOCUMENTS

2004/0234861 A1 11/2004 Kawase et al.
2014/0030605 A1 1/2014 Kim et al.
(Continued)

FOREIGN PATENT DOCUMENTS

CN 105336916 A 2/2016
EP 2696399 A2 2/2014
(Continued)

OTHER PUBLICATIONS

Machine Translation of: KR 1020160122937, Park, Oct. 25, 2016.*
(Continued)

*Primary Examiner* — Kenneth J Douyette
(74) *Attorney, Agent, or Firm* — Lerner David LLP (57) ABSTRACT

The present invention relates to a three-dimensional structure electrode, a method for manufacturing same, and an electrochemical element including the electrode. The present invention is characterized by comprising: (a) an upper conductive layer and a lower conductive layer which have a structure constituting an assembly within which a conductive material and a porous nonwoven fabric including a plurality of polymeric fibers are three-dimensionally connected in an irregular and continuous manner, thereby forming a mutually connected porous structure; and (b) an active material layer forming the same assembly structure as
(Continued)

the conductive layers and forming a three-dimensionally filled structure in which electrode active material particles are uniformly filled inside the mutually connected porous structure formed in the assembly structure, wherein the active material layer is formed between the upper conductive layer and the lower conductive layer.

7 Claims, 5 Drawing Sheets (51) Int. Cl.
  H01M 4/13      (2010.01)
  H01M 4/139     (2010.01)
  H01M 4/74      (2006.01)
  H01M 10/0525   (2010.01)
  H01M 10/0587   (2010.01)
  H01M 10/054    (2010.01)
  H01M 12/06     (2006.01)

(52) U.S. Cl.
  CPC ......... *H01M 4/74* (2013.01); *H01M 10/0587* (2013.01); *H01M 10/0525* (2013.01); *H01M 10/054* (2013.01); *H01M 12/06* (2013.01)

(56) References Cited

U.S. PATENT DOCUMENTS

| | | | |
|---|---|---|---|
| 2014/0255801 A1* | 9/2014 | Lohmann | H01M 4/8821 429/405 |
| 2014/0370351 A1 | 12/2014 | Kwon et al. | |
| 2015/0111107 A1 | 4/2015 | Oguni et al. | |
| 2016/0036037 A1* | 2/2016 | Rhodes | H01M 10/0525 429/231.95 |
| 2016/0308192 A1 | 10/2016 | Lee et al. | |
| 2017/0294656 A1 | 10/2017 | Park et al. | |
| 2017/0352866 A1 | 12/2017 | Kawai | |
| 2020/0044259 A1 | 2/2020 | Lee et al. | |

FOREIGN PATENT DOCUMENTS

| | | |
|---|---|---|
| EP | 2711338 A1 | 3/2014 |
| JP | 863172539 A | 7/1988 |
| JP | 2012015297 A | 1/2012 |
| JP | 2013206623 A | 10/2013 |
| JP | 2015109270 A | 6/2015 |
| KR | 20040086818 A | 10/2004 |
| KR | 20160043769 A | 4/2016 |
| KR | 20160057255 A | 5/2016 |
| KR | 20160062617 A | 6/2016 |
| KR | 20160122937 A | 10/2016 |
| KR | 20160123839 A | 10/2016 |
| KR | 101728828 B1 | 4/2017 |
| KR | 20170115344 A | 10/2017 |
| KR | 101817506 B1 | 1/2018 |
| KR | 20180006816 A | 1/2018 |

OTHER PUBLICATIONS

International Search Report for Application No. PCT/KR2019/013610, dated Feb. 3, 2020, pp. 1-2.

European Search Report for Application No. EP19873406.3, dated Feb. 17, 2021, 12 pages.

* cited by examiner

THREE-DIMENSIONAL STRUCTURE ELECTRODE AND ELECTROCHEMICAL ELEMENT INCLUDING SAME

CROSS-REFERENCE TO RELATED APPLICATIONS

The present application is a divisional of U.S. patent application Ser. No. 16/959,860, now U.S. Pat. No. 11,495,802, filed on Jul. 2, 2022, which is a national phase entry under 35 U.S.C. § 371 of International Application No. PCT/KR2019/013610, filed on Oct. 16, 2019, which claims priority to Korean Patent Application No. 10-2018-0124498, filed on Oct. 18, 2018, the entire contents of which are hereby incorporated by reference herein.

TECHNICAL FIELD

The present invention relates to a three-dimensional structure electrode and an electrochemical device including the same.

BACKGROUND ART

Recent trends in the electronics industry can be summarized as device and wireless, mobile trends and the shift from analog to digital. Representative examples include the rapid spread of wireless phones (mobile phones) and notebook computers, as well as the shift from analog cameras to digital cameras.

In addition to these trends, research and development on electrochemical devices as an operating power source of devices are being actively conducted. In particular, lithium secondary batteries having high output and capacity to weight, which use lithium transition metal oxides and lithium composite oxides as positive electrode active materials, have been widely spotlighted.

Secondary batteries are classified according to the structure of the electrode assembly having a positive electrode/separator/negative electrode structure. Representative examples thereof include a jelly-roll (wound) electrode assembly in which long sheet type positive electrodes and negative electrodes are wound with a separator interposed therebetween, a stacked electrode assembly in which a plurality of positive and negative electrodes cut in a predetermined size unit are sequentially stacked with a separator interposed therebetween, and a stacked/foldable electrode assembly in which bi-cells or full cells, in which positive and negative electrodes of a predetermined unit are stacked with a separator interposed therebetween, are wound with a separator sheet.

Further, the electrode generates current through the exchange of ions. The positive electrode and negative electrode constituting the electrode is formed of a structure in which the electrode active material is applied to the electrode current collector made of metal. In general, the negative electrode has a structure in which a carbon-based active material is coated on an electrode plate made of copper or aluminum, and the positive electrode has a structure in which an active material made of $LiCoO_2$, $LiMnO_2$, $LiNiO_2$, or the like is coated on an electrode plate made of aluminum.

However, since only the active material contributes substantially to the capacity and energy density of the electrochemical device among the constituent materials of the electrode, when the additive material such as the conductive material and the binder is minimized, the capacity of the electrode may increase, and the energy density of the electrochemical device can be increased.

Korean Patent No. 1728828 discloses a three-dimensional electrode having a structure in which a nonwoven fabric made of polymer fibers and a plurality of conductive materials form an assembly in three dimensions to solve the above problems, and an active material is filled in a pore structure inside the assembly. However, even if the active material of the above-described three-dimensional electrode is designed to have a high theoretical capacity, it may exhibit an insufficient reversible capacity due to low intrinsic electron conductivity.

In particular, the high capacity negative electrode active material that exceeds the theoretical capacity of natural graphite reacts with lithium through an alloying or conversion reaction, and thus it has a large volume change, which is a disadvantage. This volume change has a problem of greatly deteriorating the life characteristics of the battery. In addition, in order to compensate for this disadvantage, the electrode design includes an excessive amount of conductive material, which becomes a big problem in increasing the energy density of the battery.

In order to solve the above problem, a method of extremely reducing the particle size of the active material, a method of adding a third element having little reactivity with lithium to the metal element, etc. may be used, but so far, no material exhibiting characteristics required for commercialization has appeared.

Therefore, there is a need for technology development for solving the problem.

DISCLOSURE

Technical Problem

In order to solve the above problems, an object of the present invention is to provide a conductive layer of a structure of an assembly, in which a porous nonwoven fabric including a plurality of polymer fibers and a plurality of carbon nanotubes are three-dimensionally connected and formed, is stacked, through which even if an active material with a large volume change is applied, the electron conductive network is maintained and the detachment of active material is prevented to thereby maximize the performance of the battery.

In addition, an object of the present invention is to increase the capacity and energy density of the battery by enabling high loading of the active material in the active material layer by forming a conductive layer having a sandwich structure on the upper and lower portions of the existing three-dimensional electrode.

Technical Solution

In order to solve the above problems, the three-dimensional structure electrode of the present invention includes:
(a) an upper conductive layer and a lower conductive layer having a structure in which a porous nonwoven fabric including a plurality of polymer fibers and a conductive material are three-dimensionally, irregularly and continuously connected to form an aggregate having an interconnected pore structure formed therein; and
(b) an active material layer forming the same aggregate structure as the conductive layer, wherein electrode active material particles are uniformly filled in an interconnected pore structure formed in the aggregate structure to thereby form a three-dimensional filled structure, and the active material layer provides a three-dimensional structure electrode formed between the upper conductive layer and the lower conductive layer.

In one embodiment of the present invention, the thickness of the three-dimensional structure electrode may be 3 to 1000 μm.

In addition, the thicknesses of the upper conductive layer and the lower conductive layer may be 3% to 30% of the active material layer, respectively.

In one embodiment of the present invention, the porosity of the electrode active material layer may be 5 to 95% by volume, and the porosity of the upper conductive layer and the lower conductive layer may be 5 to 80% by volume.

The average diameter of the polymer fibers may be 0.001 to 1000 μm, and the average diameter of the active material particles may be 0.001 to 30 μm.

Next, according to one embodiment of the present invention, the content of each material included in the three-dimensional structure electrode is as follows.

The active material layer may include 5 to 70% by weight of porous nonwoven fabric and 20 to 85% by weight of active material particles based on the weight of the active material layer, and the content ratio of the active material particles and the conductive material in the active material layer may be 0.1:100 to 50:100 as a weight ratio of the conductive material to the active material particles.

The upper conductive layer or the lower conductive layer may include 10 to 50% by weight of the conductive material and 50 to 90% by weight of the porous nonwoven fabric with respect to the total weight of the upper or lower conductive layer.

Next, according to one embodiment of the present invention, materials included in the three-dimensional structure electrode may be as follows.

The conductive material may be one selected from the group consisting of carbon nanotube (CNT), silver nanowire, nickel nanowire, gold nanowire, graphene, graphene oxide, reduced graphene oxide, polypyrrole, poly 3,4-ethylenedioxythiophene, polyaniline, derivatives thereof, and mixtures thereof.

The polymer forming the plurality of polymer fibers may be one or more selected from the group consisting of polyethylene terephthalate, polyimide, polyamide, polysulfone, polyvinylidene fluoride, polyacrylonitrile, polyethylene, polypropylene, polyetherimide, polyvinyl alcohol, polyethylene oxide, polyacrylic acid, polyvinylpyrrolidone, agarose, alginate, polyvinylidene hexafluoropropylene, polyurethane, nylon 6, polypyrrole, poly 3,4-ethylenedioxythiophene, polyaniline, derivatives thereof, and mixtures thereof.

The active material particles may be one or more selected from the group consisting of lithium metal oxide, carbon-based material, oxide, silicon (Si), tin (Sn), germanium (Ge), sulfur (S), derivatives thereof, and mixtures thereof.

A method for manufacturing a three-dimensional structure electrode includes: (a) preparing a polymer solution including a polymer and a solvent;
(b) preparing a first colloidal solution including a conductive material, a dispersant and a dispersion medium;
(c) preparing a second colloidal solution further including active material particles in the first colloidal solution;
(d) preparing three-dimensional structure fibers using the polymer solution, the first colloidal solution and the second colloidal solution; and
(e) compressing the three-dimensional structure fibers to obtain three-dimensional structure fibers, in which the step (d) includes:
simultaneously spinning the polymer solution and the first colloidal solution to prepare a lower conductive layer;
simultaneously spinning the polymer solution and the second colloidal solution on top of the lower conductive layer to prepare an active material layer; and
simultaneously spinning the polymer solution and the first colloidal solution on top of the active material layer to prepare an upper conductive layer.

Meanwhile, according to one embodiment of the present invention, the step (b) may include preparing a colloidal solution by dispersing the conductive material in the dispersion medium.

Further, the step (c) may include: injecting the conductive material into the active material particles to thereby prepare mixed powder;

grinding the mixed powder to obtain active material particles/conductive material composite; and dispersing the complex in the dispersion medium to prepare the colloidal solution.

The step (d) may be to use one method selected from the group consisting of double electrospinning, double electrospray, double spray, and combinations thereof, and the spinning rate of the polymer solution may be 2 to 15 μmin, and the spinning rate of the first colloidal solution and the second colloidal solution may be 30 to 300 μmin.

According to one embodiment of the present invention, the composition of each solution in the method of manufacturing a three-dimensional structure electrode is as follows.

In addition, in the method of manufacturing the three-dimensional structure electrode, the first colloidal solution may include 0.1 to 50% by weight of the conductive material, based on the total weight of the first colloidal solution.

The second colloidal solution includes 1 to 50% by weight of active material particles, based on the total weight of the second colloidal solution, and the content ratio of the active material particles and the conductive material in the second colloidal solution may be 0.1:100 to 50:100 as a weight ratio of the conductive material to the active material particles.

The polymer solution may include 5 to 30% by weight of the polymer based on the total weight of the polymer solution.

The content of the dispersant may be 0.001 to 10% by weight based on the total weight of the first colloidal solution and the second colloidal solution.

The dispersant may be at least one selected from the group consisting of polyvinylpyrrolidone, poly3,4-ethylenedioxythiophene, and mixtures thereof, and The dispersion medium may be one selected from the group consisting of deionized water, isopropylalcohol, buthalol, ethanol, hexanol, acetone, dimethylformamide (N, N-dimethylformamide), dimethylacetamide(N, Ndimethylacetamide), methyl pyrrolidone (N, N-Methylpyrrolidone) and combinations thereof.

Further, the present invention provides an electrochemical device having an electrode assembly including a negative electrode, a positive electrode and a separator interposed between the negative electrode and the positive electrode, the electrode assembly being embedded in a battery case, in which the negative electrode or the positive electrode is a three-dimensional structure electrode according to any one of the examples disclosed herein.

The electrochemical device may be one selected from the group consisting of a lithium secondary battery, a super capacitor, a lithium-sulfur battery, a sodium ion battery, a lithium-air battery, a zinc-air battery, an aluminum-air battery, and a magnesium ion battery.

Advantageous Effects

The three-dimensional structure electrode according to the present invention minimize additives and uses light current collectors by the sandwich structure of the above-described active material layer, the upper conductive layer and the lower conductive layer, thereby maintaining the electron conductive network and preventing active material desorption even when an active material having a large volume change is applied while improving the weight and capacity per volume of the electrode.

In addition, through this, it is possible to provide an electrochemical device having high energy density and high output characteristics and excellent cycle performance.

DETAILED DESCRIPTION OF THE PREFERRED EMBODIMENTS

The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

In the present specification, when a part is "connected" to another part, this includes not only "directly connected" but also "electrically connected" between the parts while having another element therebetween.

Also, throughout the specification, when an element is referred to as "including" an element, it is understood that the element may include other elements as well unless specifically stated otherwise.

As used throughout this specification, the terms "about", "substantially", and the like, are used to mean a value or something like this when unique manufacturing and material tolerances are presented, and the terms are used to prevent unscrupulous infringers from unfair use of the disclosure including accurate or absolute figures in order to aid in the understanding of the present disclosure.

Throughout this specification, the term "combination(s) thereof" included in the expression of the Markush form means one or more mixtures or combinations selected from the group consisting of the elements described in the Markush form representation, and it means to include one or more selected from the group consisting of the above components.

The present invention relates to a negative electrode for an electrochemical device and an electrochemical device having the same. In the present invention, the electrochemical device includes all devices that undergo an electrochemical reaction, and specific examples thereof include all kinds of primary and secondary cells, fuel cells, solar cells, or capacitors. In particular, a lithium secondary battery such as a lithium metal secondary battery, a lithium ion secondary battery, a lithium polymer secondary battery or a lithium ion polymer secondary battery is preferable among the secondary batteries.

Throughout this specification, the expression "A and/or B" means "A or B or both."

In addition, in this specification, description of a "conductive layer" means an "upper conductive layer" or "lower conductive layer."

In addition, in this specification, the description of "upper" or "lower" is a term indicating the relative position of the conductive layer with respect to the active material layer.

Hereinafter, the present invention will be described in detail.

The three-dimensional structure electrode according to the present invention includes: (a) an upper conductive layer and a lower conductive layer having a structure in which a porous nonwoven fabric including a plurality of polymer fibers and a conductive material are three-dimensionally, irregularly and continuously connected to form an aggregate having an interconnected pore structure formed therein; and (b) an active material layer forming the same aggregate structure as the conductive layer, wherein electrode active material particles are uniformly filled in an interconnected pore structure formed in the aggregate structure to thereby form a three-dimensional filled structure, in which the active material layer is formed between the upper conductive layer and the lower conductive layer.

Figure 1:
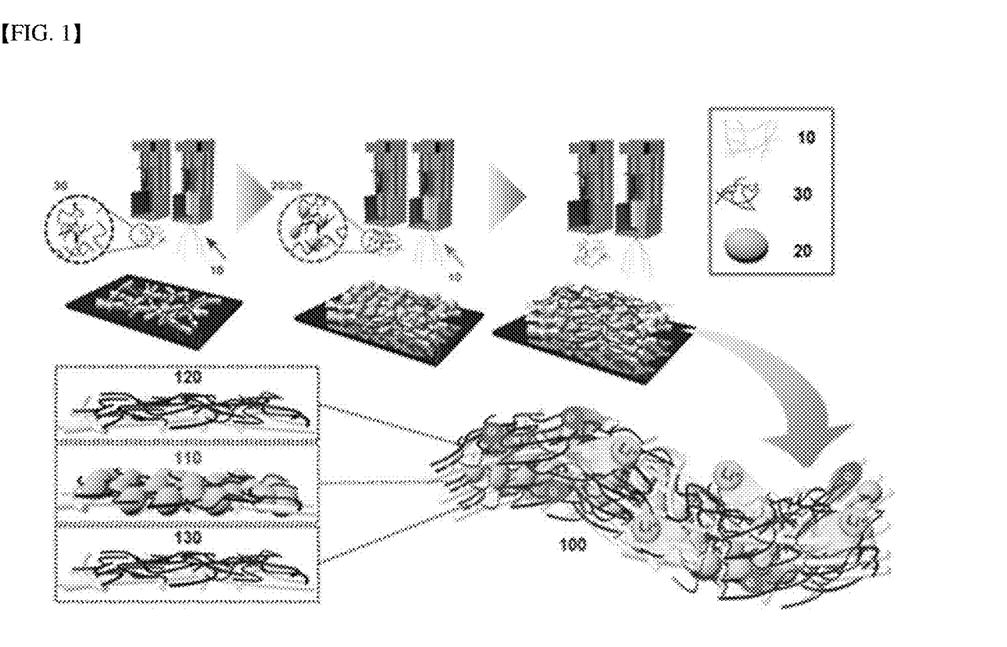
FIG. 1 is a schematic diagram showing the structure of a three-dimensional structure electrode and a manufacturing method of the three-dimensional structure electrode according to an embodiment of the present invention.

FIG. 1 is a schematic diagram showing the structure of a three-dimensional structure electrode and a manufacturing method of the three-dimensional structure electrode according to an embodiment of the present invention.

Specifically, the three-dimensional structure electrode 100 according to the present invention has a three-dimensional filling structure. In the case of the active material layer 110, a plurality of polymer fibers 10 included in the porous nonwoven fabric serve as a support, the positive electrode active material particles 20 and the conductive material 30 are uniformly filled between the plurality of polymer fibers 10, and the interconnected porous network is formed by the plurality of polymer fibers 10.

This minimizes the material added to the three-dimensional structure electrode, and reduces the weight per area by using a light current collector while maintaining a good electron conductive network. Specifically, a separate binder is not added, and a porous nonwoven fabric of a light material is used instead of a metal current collector. Further, by forming the active material particles surrounded by the conductive material in the three-dimensional filling structure, it is possible to contribute to the high output characteristics of the electrochemical device by uniformizing the electron conductive network, which improves the discharge characteristics compared to the general electrode.

In addition, in the three-dimensional electrode according to the present invention, the upper conductive layer 120 and the lower conductive layer 130 are formed on the upper and lower portions of the active material layer to form a sandwich-type electrode structure. Further, the conductive material 30 is filled in the plurality of polymer fibers 10 included in the porous nonwoven fabric in the upper conductive layer and the lower conductive layer to form a three-dimensional aggregate structure.

In general, active materials are developed in various structures and components, and graphite, which is a commercially available negative electrode material, exhibits a very reversible charging and discharging behavior, thereby exhibiting long life characteristics. However, since graphite has a low theoretical capacity (theoretical capacity is limited to about 370 mAh/g), various materials such as high capacity silicon and transition metal oxide have been developed to replace graphite. In particular, research has been conducted to replace carbon-based materials such as graphite using silicon having a high theoretical capacity (4200 mAh/g) as a negative electrode active material.

However, most high-capacity materials have a disadvantage of slow charging and discharging due to low electrical conductivity. In addition, the high capacity material as described above has a disadvantage that the volume change is large due to the conversion reaction or alloying reaction.

For example, in the case of the alloying reaction, the negative electrode active material containing Si elements or metal elements has a large structural change and large volume expansion during the metal alloying process with Li. In forming $Li+_\chi M_{-\chi}$, the host metal (M) not only accumulates Li ions but also accepts the same number of electrons as Li ions. In other words, the metal becomes an anion having a larger radius than the neutral atom by the next charge transfer reaction.

$$M^0 +_\chi e^- \leftrightarrow Mx^{\chi-}$$

As a result, the volume of Li-inserted metal is increased by 100 to 400% compared to the case without Li. Moreover, Li alloy is brittle because of its ionic bonding properties, and mechanical stability is poor due to mechanical stress caused by volume change.

Thus, such volume changes increase as the cycle continues, leading to breakage of the electrode network and to degradation behavior such as active material cracking and surface unstable solid-electrolyte-interphase (SEI) layer formation, which may result in a situation that the capacity rapidly decreases within several cycles of charge and discharge.

In particular, when viewed from the inside of the electrode structure, the adhesive force between the current collector and the active material layer is lower than the adhesive force between the active material and the active material, resulting in a large stress at the interface during charging and discharging, thereby causing a detachment phenomenon of the active material.

Therefore, in order to prevent this phenomenon, by forming the conductive layer on the upper and lower portions of the active material layer, the conductive layer serves as a buffer zone that can alleviate the detachment of the active material, thereby suppressing the active material detachment, and even if the volume change of the active material occurs, the conductive layer can maintain the electron conductive network. Through this, it is possible to prevent a decrease in capacity of the battery, increase conductivity of the electrode, thereby improving cycle life characteristics of the battery, and increase energy density. Furthermore, even if a strong external force is applied by bending or the like, the desorption phenomenon of the active material is suppressed, thereby contributing to the improvement of fluidity of the electrode.

Hereinafter, the structure of a three-dimensional structure electrode according to the present invention will be described.

As described above, the three-dimensional structure electrode 100 according to the present invention has a structure in which the active material layer 110 is interposed between the upper conductive layer 120 and the lower conductive layer 130.

The active material layer 110 forms an aggregate in which the porous nonwoven fabric and the conductive material included in the porous nonwoven fabric are irregularly and continuously connected in three dimensions to form a pore structure interconnected therein, and the active material particles are filled in the aggregate. More specifically, the conductive material is uniformly filled in a plurality of non-uniform spaces formed in the porous nonwoven fabric, and the active material particles are filled therein.

The porosity of the active material layer may be 5 to 95% in order to allow easy absorption of the electrolyte and improve the performance of the electrochemical device by appropriately adjusting the mobility of the ions, and the porosity may be more preferably 30 to 90% by volume in order to improve the ion conductivity and mechanical strength of the three-dimensional structure electrode.

When the porosity of the active material layer exceeds 95% by volume, the loading value of the electrode may become too small compared to the volume, and the distance between the active material particles and the conductive material may increase, making it difficult to form an electron conductive network. In addition, when the porosity is less than 5% by volume, the porosity may be so small that the ion conductivity of the three-dimensional structure electrode may be decreased.

Herein, the porosity of the upper conductive layer and the lower conductive layer is preferably smaller than the porosity of the active material layer in terms of suppression of active material detachment and electron conduction network retention, and the porosity is preferably 5 to 80% by volume, and more preferably 20 to 60% by volume.

When the porosity of the upper conductive layer and the lower conductive layer is less than 5% by volume, the porosity is too small to reduce ion mobility and electron mobility from the active material layer, thereby degrading battery performance, and when the porosity is 80% by volume or more, it is difficult to suppress detachment of active material particles from the active material layer, and it is difficult to increase energy density of the battery.

The porosity of the three-dimensional electrode can be controlled by the diameter of the polymer fiber and the active material particles, and the content of the polymer fiber, conductive material, active material particles added.

In addition, the thickness of the three-dimensional structure electrode according to the present invention may be 3 to 1000 μm for the ease of electrode manufacturing process and a smooth formation of an electron conductive network. If the thickness of the electrode exceeds 1000 μm, the electronic conductivity in the thickness direction may be lowered, and the output characteristics of the battery may be lowered. If the thickness is less than 3 μm, the electrode thickness is so thin that the capacity of the electrode can be reduced. Furthermore, in order to maximize the effect of the present invention, it is more preferable to form the electrode to a thickness of 10 to 300 μm.

In addition, in the three-dimensional electrode according to the present invention, the thickness of the upper conductive layer or the lower conductive layer may be 3 to 30% and more preferably 5 to 10% of the active material layer, respectively. When the thickness of the upper conductive layer or the lower conductive layer is less than 3% of the active material layer, the thickness is too thin to prevent the active material detachment due to the volume change of the active material and the electron conduction network may be damaged by the active material detachment. On the contrary, when the thickness of the upper conductive layer or the lower conductive layer exceeds 30% of the active material layer, a problem may occur that ion mobility from the active material layer may be reduced.

Meanwhile, in the three-dimensional structure electrode according to the present invention, the weight per area of the active material layer may be 0.001 mg/cm$^2$ to 1 g/cm$^2$, and the weight per area of the upper conductive layer and the lower conductive layer may be 5 to 10% of the weight of the active material layer.

The range is to minimize the additive material in the three-dimensional structure electrode, and the weight per area of the electrode is reduced by using a porous nonwoven fabric, which is a light material, instead of a general metal current collector. In addition, since the weight per area of the electrode is affected by the content of the active material, the weight per area of the upper conductive layer and the lower conductive layer containing no active material particles is reduced compared to the active material layer, and the total weight per area of the electrode is also smaller than that of the active material layer.

When the weight per area of the electrode decreases below the range, the energy density of the electrode is lowered, and when the weight per area of the electrode is greater than the range, the electrode may become too heavy compared to the performance of the electrode. In particular, in order to maximize the performance of the three-dimensional structure electrode, the weight per area of the upper conductive layer and the lower conductive layer is more preferably 0.001 to 50 mg/cm$^2$. In addition, the three-dimensional structure electrode may be a multilayer structure formed by a plurality of electrodes in order to maximize the loading amount of the active material particles and improve the capacity and energy density of the electrochemical device.

The weight per area of the three-dimensional structure electrode formed in a multilayer structure as described above may be 0.002 to 10 g/cm$^2$.

In addition, the three-dimensional structure electrode according to the present invention may be polar for good wettability to the electrolyte.

In addition, the three-dimensional structure electrode may be a positive electrode or a negative electrode.

Next, materials included in the three-dimensional structure electrode will be described.

First, the plurality of polymer fibers included in the active material layer and the conductive layer are not limited to their types as long as they can be non-uniformly collected to form a porous nonwoven fabric. However, it is preferable that the polymer has heat resistance to ensure thermal stability of the electrode.

Specifically, the polymer forming the plurality of polymer fibers may be one or more selected from the group consisting of polyethylene terephthalate, polyimide, polyamide, polysulfone, polyvinylidene fluoride, polyacrylonitrile, polyethylene, polypropylene, polyetherimide, polyvinyl alcohol, polyethylene oxide, polyacrylic acid, polyvinylpyrrolidone, agarose, alginate, polyvinylidene hexafluoropropylene, polyurethane, nylon 6, polypyrrole, poly 3,4-ethylenedioxythiophene, polyaniline, derivatives thereof, and mixtures thereof. Further, the polymer may be one or more selected from the group consisting of carbon nanotube, graphene, graphene oxide, reduced graphene oxide, polypyrrole, poly 3,4-ethylenedioxythiophene, polyaniline, derivatives thereof, and mixtures thereof. In particular, polyacrylonitrile is most preferred in view of the mechanical and chemical stability of the polymer.

The polymer fiber may have an average diameter of 0.001 to 100 μm, more preferably 0.01 to 2 μm.

By using the polymer fibers within the numerical range, it is possible to ensure sufficient space for filling the active material particles and the conductive material in the plurality of polymer fibers forming the three-dimensional aggregate structure, and a uniform pore structure can be formed in the polymer fiber, which can be advantageous for electrolyte absorption and ion migration.

If the diameter of the polymer fiber is less than 0.001 μm, the polymer fiber comes to have a weak physical property not to play a role of the support, and if the thickness exceeds 100 μm, the thickness of the polymer fiber is so thick that the pores formed therein may be reduced, thereby making it difficult to fill the active material particles and the conductive material.

In terms of increasing the capacity of the active material layer electrode, it may include 5 to 70% by weight of a porous nonwoven fabric with respect to the total weight of the active material layer, and more preferably 15 to 60% by weight of a porous nonwoven fabric. In addition, the upper conductive layer or the lower conductive layer may contain 50 to 90% by weight of the porous nonwoven fabric based on the weight of the upper conductive layer or the lower conductive layer, more preferably 60 to 80% by weight of the porous nonwoven fabric.

When the content of the porous nonwoven fabric in the active material layer or the conductive layer exceeds the above range, the content of the active material particles or the conductive material relative to the porous nonwoven fabric may be excessively reduced, resulting in a decrease in electronic conductivity. On the contrary, when the content of the porous nonwoven fabric is less than the above range, the structure of the electrode cannot be maintained because the porous nonwoven fabric is not sufficient enough to perform a role of a support. In particular, it is preferable that the porous nonwoven fabric in the conductive layer has a larger content ratio than the active material layer in order to prevent the active material from being detached.

Next, the active material particles may be one or more selected from the group consisting of the aforementioned lithium metal oxides, other oxides, silicon (Si), tin (Sn), germanium (Ge), sulfur (S), derivatives thereof, and mixtures thereof. Specifically, the lithium metal oxide and its derivatives may be positive electrode active materials, and the electrode, to which the positive electrode active materials have been applied, may become a positive electrode. On the other hand, oxides, silicon (Si), tin (Sn), germanium (Ge), sulfur (S), and derivatives thereof may be a negative electrode active material, and the electrode, to which they have been applied, may become a negative electrode.

In addition, the active material particles may be coated with a carbon-based compound, and the carbon-based compound may be non-graphitized carbon, graphite-based carbon, etc., but is not limited thereto.

Among the active material particles, the lithium metal oxide may be at least one selected from the group consisting of lithium nickel oxide, lithium cobalt oxide, lithium manganese oxide, lithium titanium oxide, lithium nickel manganese oxide, lithium nickel cobalt manganese oxide, lithium nickel cobalt aluminum oxide, lithium iron phosphate oxide, lithium vanadium phosphate oxide, lithium manganese phosphate, lithium manganese silicate oxide, lithium iron silicate oxide, and combinations thereof.

That is, one or more of complex oxides of lithium and metal of cobalt, manganese, nickel or a combination thereof can be used. As a specific example, the compound represented by any of the following formulas can be used.

Specifically, the examples of the positive electrode active material may include a lithium cobalt oxide ($LiCoO_2$) substituted with one or more transition metals; a layered compound such as lithium nickel oxide ($LiNiO_2$); a lithium manganese oxide substituted with one or more transition metals; a lithium nickel oxide represented by the formula $LiNi1-yMyO_2$ (wherein M=Co, Mn, Al, Cu, Fe, Mg, B, Cr, Zn or Ga and including one or more of the above elements, $0.01 \leq y \leq 0.7$); a lithium nickel cobalt manganese composite oxide represented by $Li_{1\pm z}Ni_b Mn_c Co_{1-(b+c+d)}M_d O_{(2-e)}A_e$ such as $Li_{1+z} Ni_{1/3}Co_{1/3}Mn_{1/3}O_2$, $Li_{1+z}Ni_{0.4}Co_{0.4}Mn_{0.2}O_2$, etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, b+c+d<1, M=Al, Mg, Cr, Ti, Si or Y and A=F, P or Cl); and an olivine-based lithium metal phosphate represented by $Li_{1+x}M_{1-y}M'_y PO_{4-z}X_z$ (wherein M=transition metal, preferably Fe, Mn, Co or Ni, M'=Al, Mg or Ti, X=F, S or N, $-0.5 \leq x \leq +0.5$, $0 \leq y \leq 0.5$, $0 \leq z \leq 0.1$), but not limited thereto.

In addition, the oxide in the active material particles may be metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$.

Examples of materials that can be used as other negative electrode active materials may include metal complex oxide such as $Li_xFe_2O_3(0 \leq x \leq 1)$, $Li_xWO_2(0 \leq x \leq 1)$, $Sn_xMe_{1-x}Me'_yO_z$ (Me:Mn, Fe, Pb, Ge; Me':Al, B, P, Si, group 1, 2, 3 elements of the periodic table, halogen; $0 \leq x \leq 1$; $1 \leq y \leq 3$; $1 \leq z \leq 8$), etc.; lithium metal; lithium alloy; silicon-based alloy; tin alloy; conductive polymer such as polyacetylene, etc., but not limited thereto.

In particular, as the active material particles, active material particles having a large theoretical capacity include Si, SiO, Ge, Sn, and S.

The average diameter of the active material particles may be 0.001 to 30 μm, more preferably 0.001 to 10 μm. By adjusting the size of the active material particles as described above, the porosity of the active material layer can be adjusted to the above-mentioned range. Moreover, as mentioned later, dispersibility in a second colloidal solution containing active material particles can be improved, and the pore of the three-dimensional structure electrode by an electrospinning method can be made uniform.

If the average diameter of the active material particles is less than 0.001 μm, the electrode density becomes low so that the electrode cannot have a proper capacity per volume, the size of the particles can become too small to be handled, and it is difficult to prevent the active material detachment.

In addition, when the average diameter of the active material particles exceeds 30 μm, due to the size of the active material particles, the dispersion state of the second colloidal solution to be described later may be uneven, the active material particles may be difficult to be uniformly filled in the pores, and the volume of the active material may be increased to an excessively large size.

The active material layer may include 20 to 85% by weight of active material particles based on the weight of the active material layer, and more preferably 30 to 75% by weight of active material particles. By adjusting the content of the active material particles to the above range, the capacity and energy density of the electrochemical device can be improved, and the porosity of the three-dimensional structure electrode can be controlled.

When the content of the active material particles exceeds 85% by weight, the content of the active material particles is excessively large compared to the porous nonwoven fabric, so that it is difficult for the porous nonwoven fabric to play a role of supporting the electrode, which makes it difficult to maintain the electrode structure. On the contrary, when the content of the active material particles is less than 20%, the content of the active material particles is too small to form an electron conductive network between the active material particles and the conductive material, and the output of the electrode may be reduced.

Next, in the three-dimensional structure electrode according to the present invention, the conductive material serves to form an electron conductive network together with the active material particles, and if the electron conductive network can be formed, the kind is not particularly limited.

The conductive material is one or more selected from the group consisting of carbon nanotube (CNT), silver nanowire, nickel nanowire, gold nanowire, graphene, graphene oxide, reduced graphene oxide, polypyrrole, poly 3,4-ethylenedioxythiophene, polyaniline, derivatives thereof, and mixtures thereof, and carbon nanotube is more preferred in terms of mechanical strength and electronic conductivity.

In the active material layer, the content of the conductive material may be 0.1:100 to 50:100 as a weight ratio of the conductive material to the active material particles. By containing conductive materials in the above range, it is possible to form an electron conductive network to thereby improve the output of the electrochemical device.

If the content of the conductive material is less than the above range, the formation of the electron conductive network may be insufficient, resulting in a decrease in the output of the electrochemical device. On the other hand, if the content of the conductive material exceeds the above range, the dispersion state of the first colloidal solution and the second colloidal solution to be described later may not be maintained, and thus a uniform electrode structure may not be formed.

In addition, in order to form an electron conducting network, the upper conductive layer and the lower conductive layer may include 10 to 50% by weight of the conductive material, more preferably 20 to 40% based on the total weight of the upper conductive layer or the lower conductive layer.

When the content of the conductive material exceeds 50% by weight, the content of the porous nonwoven fabric constituting the conductive layer is small, so that the conductive layer is difficult to be supported and the active material detachment cannot be effectively suppressed. On the contrary, when the content of the conductive material is less than 10% by weight, it is difficult to form the electron conductive network of the conductive layer, and there is a problem in that the output characteristics of the electrode may be reduced when the electron conductive network is damaged by the volume change of the active material.

Next, a method of manufacturing the three-dimensional structure electrode according to the present invention will be described.

Method for manufacturing a three-dimensional structure electrode according to the present invention includes: (a) dissolving a polymer in a solvent to prepare a polymer solution containing the polymer and the solvent; (b) dispersing the conductive material in the dispersion medium to prepare a first colloidal solution including the first conductive material, the dispersant and the dispersion medium; (c) dispersing the active material particles and the conductive material in a dispersion medium to prepare a second colloidal solution further including active material particles in the first colloidal solution; (d) preparing three-dimensional structural fibers from the polymer solution, the first colloidal solution and the second colloidal solution; (e) compressing the three-dimensional structural fibers to obtain three-dimensional structural fibers, in which the step (d) includes forming a porous non-woven fabric including a plurality of polymer fibers, uniformly filling the active material particles and the conductive material between the plurality of polymer fibers contained in the porous nonwoven fabric, and forming pores.

Further, the step (d) may include: simultaneously spinning the polymer solution and the first colloidal solution to prepare a lower conductive layer; simultaneously spinning the polymer solution and the second colloidal solution on top of the lower conductive layer to prepare an active material layer; and simultaneously spinning the polymer solution and the first colloidal solution on top of the active material layer to prepare an upper conductive layer.

That is, by simultaneously spraying the polymer solution and the first colloidal solution or the second colloidal solution, a three-dimensional structure electrode having excellent characteristics may be manufactured.

As described above, the active material particles included in the second colloidal solution may include at least one selected from the group consisting of lithium metal oxide, oxide containing metal oxide, silicon (Si), tin (Sn), germanium (Ge), sulfur (S), a derivative thereof, and a mixture thereof.

Specifically, the second colloidal solution is spun simultaneously with the polymer solution to form a pore structure interconnected by a plurality of polymer fibers serving as a support and to form a three-dimensional filling structure by the active material particles and the conductive material, and the first colloidal solution is spun onto the upper and lower portions of the active material layer simultaneously with the polymer solution to form a three-dimensional aggregate structure made of a plurality of polymer fibers and a conductive material.

First, a step (a) of preparing a polymer solution containing the polymer and a solvent will be described.

In order to form a plurality of polymer fibers and porous nonwoven fabric therefrom by spraying the polymer solution, the polymer solution may include 5 to 30% by weight of the polymer with respect to the total weight of the polymer solution, more preferably 10 to 15% by weight of polymer.

If the polymer fiber is less than 5% by weight, the polymer solution may not be evenly spun and beads may be formed. If it exceeds 30% by weight may cause a problem that the polymer solution is hardened at the end of the nozzle that is spinning, and spinning is not smooth.

The solvent that can be used in the polymer solution is not particularly limited as long as it can dissolve the polymer. Typically, at least one selected from the group consisting of dimethylformamide (N, N-dimethylformamide), dimethyl acetamide (N, N-dimethylacetamide), methylpyrrolidone (N, N-Methylpyrrolidone), and combinations thereof, and dimethylformamide (N, N-dimethylformamide) is preferably used.

Next, the steps of (b) preparing a first colloidal solution containing a conductive material, a dispersant and a dispersion medium, and (c) preparing a second colloidal solution further containing active material particles in the first colloidal solution will be described.

The content of the conductive material in the first colloidal solution preferably includes 0.1 to 50% by weight of the conductive material, and more preferably 1 to 20% by weight of the conductive material, based on the total weight of the first colloidal solution. In addition, the content of the conductive material in the second colloidal solution may be 0.1:100 to 50:100 as the weight ratio of the conductive material to the active material particles. By controlling the content of the conductive material in the range as described above, it is possible to maintain the electron conductive network of the three-dimensional structure electrode.

If the content of the conductive material is less than the above range, the formation of the electron conductive network may be insufficient, resulting in a decrease in the output of the electrochemical device. On the other hand, if the content of the conductive material exceeds the above range, the dispersion state of the first colloidal solution may not be maintained, and thus a uniform electrode structure may not be formed.

The second colloidal solution may include 1 to 50% by weight of active material particles based on the total weight of the second colloidal solution. Through this, porosity in the three-dimensional structure electrode can be controlled.

When the content of the active material particles is less than 1% by weight, the loading amount of the active material of the three-dimensional structure electrode becomes small, it is difficult to form an electron conductive network between the active material particles and the conductive material, and the output of the electrode may be reduced. When the content of the active material particles exceeds 50% by weight, it is difficult to disperse the active material particles, and thereafter, when the active material layer is formed, the content of the active material particles is too high, so that it is difficult for the porous nonwoven fabric to support the electrode, and thus it is difficult to maintain the electrode structure.

Herein, the step (b) may include preparing a colloidal solution by dispersing the conductive material in the dispersion medium, and the step (c) may include: pelverizing the active material particles; and dispersing the pulverized active material particles and the pulverized conductive material in the dispersion medium to prepare the second colloidal solution.

More specifically, step (c) may include: injecting the conductive material into the active material particles to prepare a mixed powder; grinding the mixed powder to obtain active material particles/conductive material composite; and dispersing the composite in the dispersion medium to prepare the second colloidal solution.

Grinding the active material particles as described above is for the uniform dispersion of the active material particles in the second colloidal solution and is related to limiting the average diameter of the active material particles in the three-dimensional structure electrode. Specifically, before the preparation of the second colloidal solution, when the active material particles having an average diameter of micrometers are pulverized into particles having an average diameter of nanometers, the active material particles are easily dispersed in the colloidal solution.

However, when the active material particles have an average diameter of nanometers, the grinding step may be unnecessary. As described above, the active material particles may be uniformly dispersed in the second colloidal solution, thereby further enhancing the electronic conductivity of the surface of the active material particles.

Meanwhile, in the steps (b) and (c), the dispersant is a material that can help the dispersion of the conductive material in the colloidal solution, and the content of the dispersant may be 0.001 to 10%, more preferably 0.01 to 1% based on the total weight of the first colloidal solution and the second colloidal solution.

When the content of the dispersant is less than 0.001% by weight, the amount of the dispersant is too small to disperse the particles in the colloidal solution, and when the content of the dispersant exceeds 10% by weight, the amount of the dispersant may be excessively increased to thereby excessively increase the viscosity of the colloidal solution.

Specifically, the dispersant may be at least one selected from the group consisting of polyvinylpyrrolidone, poly 3, 4-ethylenedioxythiophene, and mixtures thereof. Specifically, polyvinylpyrrolidone is preferable in view of the dispersing effect.

The dispersant is not particularly limited as long as it can disperse the active material particles and the conductive material, and may be one or more selected from the group consisting of deionized water, isopropyl alcohol, butanol, ethanol, and hexanol, acetone, dimethylformamide (N, N-dimethylformamide), dimethylacetamide (N, N-dimethylacetamide), methyl pyrrolidone (N, N-Methylpyrrolidone) and combinations thereof. Specifically, a mixed solvent of distilled water and isopropyl alcohol is preferable in view of the dispersing effect.

Next, the step (d) of manufacturing the three-dimensional structure fibers using the polymer solution, the first colloidal solution, and the second colloidal solution will be described.

As described above, step (d) includes forming a lower conductive layer; forming an active material layer on the lower conductive layer; and forming an upper conductive layer on top of the active material layer.

The step (d) is to simultaneously spin the polymer solution and the first colloidal solution or the second colloidal solution so that the porous nonwoven fabric and the conductive material form a three-dimensional aggregate structure. The method of simultaneously spinning the solution is not particularly limited, but may be one selected from the group consisting of double electrospinning, double electrospray, double spray, and combinations thereof. Among them, the method of double electrospinning is preferable in terms of three-dimensional filling structure and uniform pore formation.

Also, step (d) may be performed for 50 minutes to 24 hours. The three-dimensional structure electrode can be formed within the range of this execution time, and in particular, the high loading of the active material particles in the three-dimensional structure electrode is possible as the execution time increases.

The spinning rate of the polymer solution may be 2 to 15 µl/min, and the spinning rate of the first colloidal solution and the second colloidal solution may be 30 to 300 µmin. More preferably, the spinning rate of the polymer solution may be 5 to 10 µl/min, and the spinning rate of the first colloidal solution and the second colloidal solution may be 50 to 200 µl/min. By spinning the solution at the spinning rate as described above, such a three-dimensional structure electrode can be formed, and the loading of the active material particles in the three-dimensional structure electrode can be improved.

However, when the spinning rate of the solution is less than the above rate range, the polymer solution may not be evenly spun and beads may be formed or the colloidal solution may not be spun uniformly.

In addition, the present invention provides an electrochemical device having an electrode assembly including a negative electrode, a positive electrode and a separator interposed between the negative electrode and the positive electrode, the electrode assembly being embedded in a battery case, in which the negative electrode or the positive electrode is a three-dimensional structure electrode.

The electrochemical device may be one selected from the group consisting of a lithium secondary battery, a super capacitor, a lithium-sulfur battery, a sodium ion battery, a lithium-air battery, a zinc-air battery, an aluminum-air battery, and a magnesium ion battery, and specifically may be a lithium secondary battery. In addition, the lithium secondary battery may include both a cylindrical battery, a square battery, a coin-type battery, a pouch-type battery, and the like, and the form of the lithium secondary battery is not particularly limited.

Figure 2:
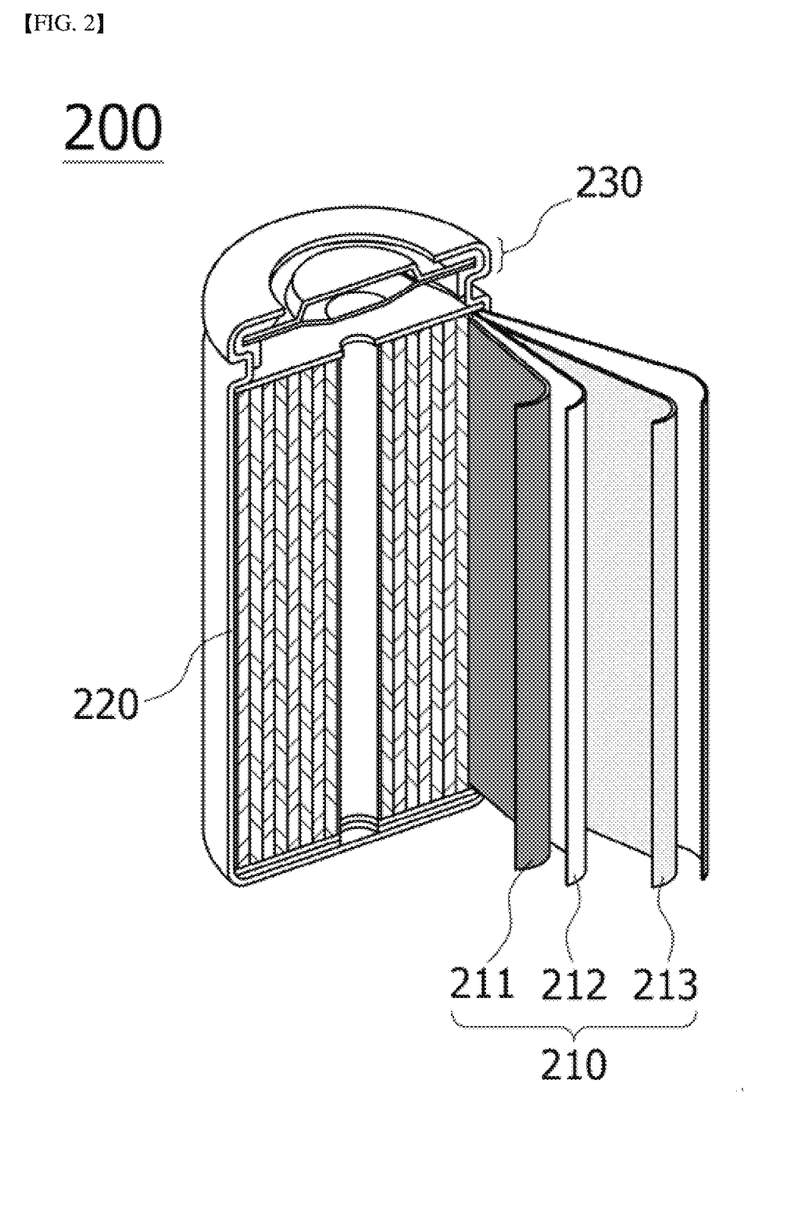
FIG. 2 is a schematic view showing a lithium secondary battery according to the present invention.

FIG. 2 is a schematic view showing a lithium secondary battery 200 according to an embodiment of the present invention.

Referring to FIG. 2, in the lithium secondary battery 200 according to the exemplary embodiment, the electrode assembly 210 is accommodated in the receiving portion of the battery case 220, the electrolyte is injected into the receiving portion so that the electrode assembly 210 is completely immersed in the battery case 140, and a cap assembly 230 for sealing the case is mounted on and coupled with the battery case 110. The electrode assembly includes a separator 212 interposed between the positive electrode 213 including the positive electrode active material and the negative electrode 211 including the negative electrode active material.

As the electrolyte, a nonaqueous electrolyte in which lithium salt is dissolved in an organic solvent, a polymer electrolyte, an inorganic solid electrolyte, and a composite material of a polymer electrolyte and an inorganic solid electrolyte, etc. may be used.

The non-aqueous organic solvent serves as a medium through which ions involved in the electrochemical reaction of the battery can move. As the non-aqueous organic solvent, carbonate-based, ester-based, ether-based, ketone-based, alcohol-based or aprotic solvents can be used. Non-aqueous organic solvents may be used alone or in combination of one or more of them, the mixing ratio in the case of mixing more than one can be appropriately adjusted according to the desired battery performance, which can be widely understood by those skilled in the art.

Examples of the non-aqueous organic solvent include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl- 2-imidazolidinone, propylene carbonate derivatives, tetrahydrofuran derivatives, ethers, methyl pyrophosphate, ethyl propionate, etc.

Examples of the organic solid electrolyte include a polymer electrolyte such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, a polymerizer including an ionic dissociation group, and the like.

Examples of the inorganic solid electrolyte include nitrides, halides, and sulfates of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

Lithium salt is dissolved in a non-aqueous organic solvent or the like to act as a lithium ion source in the battery to operate the lithium secondary battery, and promote the movement of lithium ions between the positive electrode and negative electrode.

The lithium salt is a substance that is soluble in the non-aqueous electrolyte. The examples of the lithium salt include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium 4-phenylborate, imide and the like.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

EXAMPLE

Preparation of Polymer Solution

First, polyacrylonitrile (PAN) is used as a polymer for preparing a porous polymer, and dimethylformamide (N, N-dimethylformamide) is used as a solvent to dissolve the polymer.

After adding the polyacrylonitrile (PAN) to dimethylformamide (N, N-dimethylformamide), a polymer solution was prepared so that the content of polyacrylonitrile (PAN) in the solution becomes 10% by weight.

Preparation of the First Colloidal Solution

In order to prepare a colloidal solution including a conductive material, carbon nanotubes are used as the conductive material, and a co-solvent, which is generated by mixing distilled water with isopropyl alcohol in a weight ratio of 3:7 was used as the dispersing medium. Specifically, carbon nanotubes were added to be 5% by weight of the first colloidal solution, and polyvinylpyrrolidone as a dispersant was added so as to contain 1% by weight of the colloidal solution.

Preparation of Second Colloidal Solution

In order to prepare a colloidal solution including active material particles and conductive materials, silicon (Si) having an average diameter of 100 nm were used as the active material particles, carbon nanotubes were used as the conductive materials, and as a dispersion medium, distilled water and iso-propyl alcohol were used as co-solvent.

Specifically, after dispersing the silicon (Si) in the dispersion medium (weight ratio represented by deionized water:iso-propylalcohol=3:7), an active material particle solution was prepared such that the content of silicon (Si) in the solution was 1% by weight.

The carbon nanotubes were added to the active material particle solution at 10 wt % based on the weight of silicon (Si) to prepare a colloidal solution in which the silicon (Si) and the carbon nanotubes were dispersed together. At this time, polyvinylpyrrolidone as a dispersant was added so as to contain 1 wt % of the colloidal solution.

Preparation of Electrodes by Double Electrospinning

After introducing the polymer solution, the first colloid and the second colloidal solution into an electrospinning device (purchased from Nano NC), three-dimensional structural fibers were produced by simultaneous spinning (double electrospinning) for about 240 minutes at the spraying rate of the polymer solution of 5 µl/min, and the spraying rate of the colloidal solution of 120 µl/min.

Specifically, the polymer solution and the first colloidal solution were spun to form a lower conductive layer, then the polymer solution and the second colloidal solution were spun on top of the lower conductive layer to form an active material layer, and the polymer solution and the first colloidal solution were spun on top of the active material layer to form an upper conductive layer.

The manufactured three-dimensional structural fibers were compressed using a roll press. Through this, a three-dimensional structure electrode having an active material loading of about 2 mg/cm$^2$ and a thickness of about 12 µm was obtained.

Preparation of Lithium Secondary Battery

The obtained three-dimensional structure electrode was applied as a positive electrode to fabricate a lithium secondary battery.

Specifically, lithium metal was used as a negative electrode, and polyethylene (tonen 20 µm) was used as a separator.

LiPF6 was dissolved in an organic solvent (EC:DEC=1:1 (v:v)) so that the concentration of LiPF6 becomes 1M, and a non-aqueous electrolyte solution containing 10 wt % of FEC was prepared.

A cylindrical cell was formed by inserting the positive electrode, the negative electrode, and the separator prepared as described above, and the non-aqueous electrolyte was injected into the cell to prepare a cylindrical lithium secondary battery.

COMPARATIVE EXAMPLE

An electrode was manufactured in the same manner as in the example except that an electrode having only an active material layer formed therein was prepared with an active material loading of about 2.0 mg/cm$^2$ and a thickness of about 10 µm without preparing the first colloidal solution and without forming the upper conductive layer and the lower conductive layer at the time of performing double electro spinning.

In addition, a lithium rechargeable battery was manufactured in the same manner as in the example.

Experimental Example 1: Observation of Electrode

Figure 4:
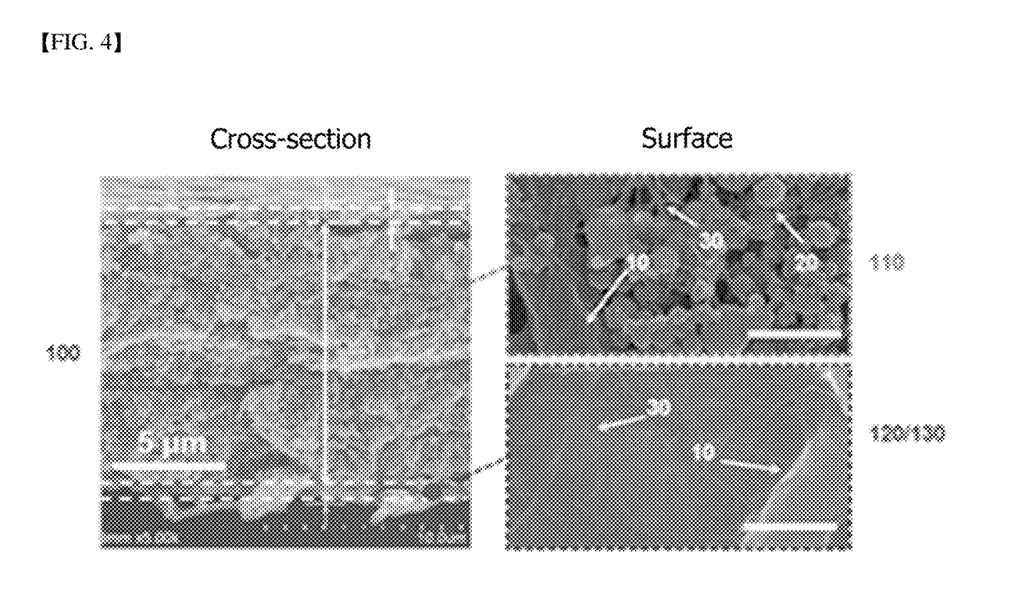
FIG. 4 is a photograph of a cross-section and a surface of a three-dimensional structure electrode observed with a scanning electron microscope according to an embodiment of the present invention.

The cross-section and the surface of the upper conductive layer and the lower conductive layer and the active material layer of the electrode prepared by the examples was observed using Scanning Electron Microscope (SEM), and the results are shown in FIG. 4.

Figure 3:
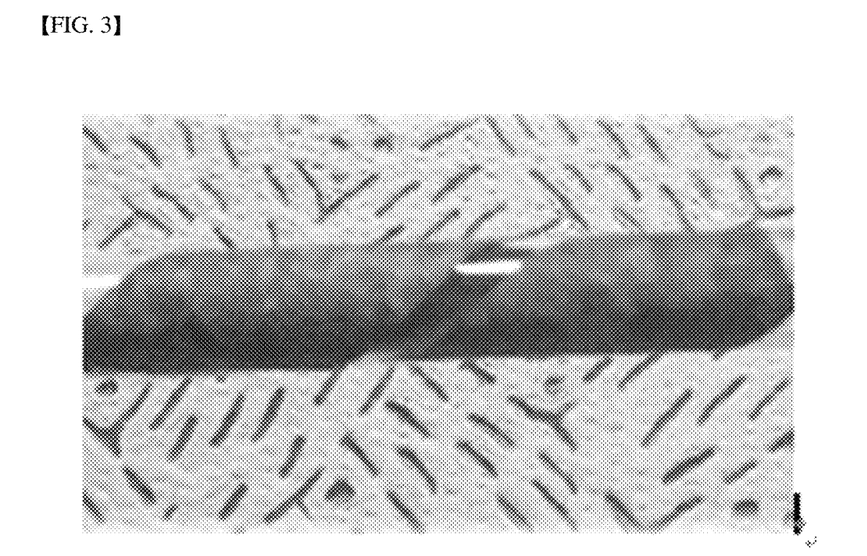
FIG. 3 is a photograph showing the appearance of a three-dimensional structure electrode according to an embodiment of the present invention.

FIG. 3 is a photograph showing the appearance of the electrode according to the embodiment. Referring to FIG. 3, it can be seen that the structure of the electrode is well maintained without detaching the active material particles even when the electrode is bent.

Experimental Example 2: Comparison of Electron Conductivity of Electrode

In order to compare the resistance of the surface of each electrode manufactured through the Examples and Comparative Examples, the electron conductivity measurement was performed.

Figure 5:
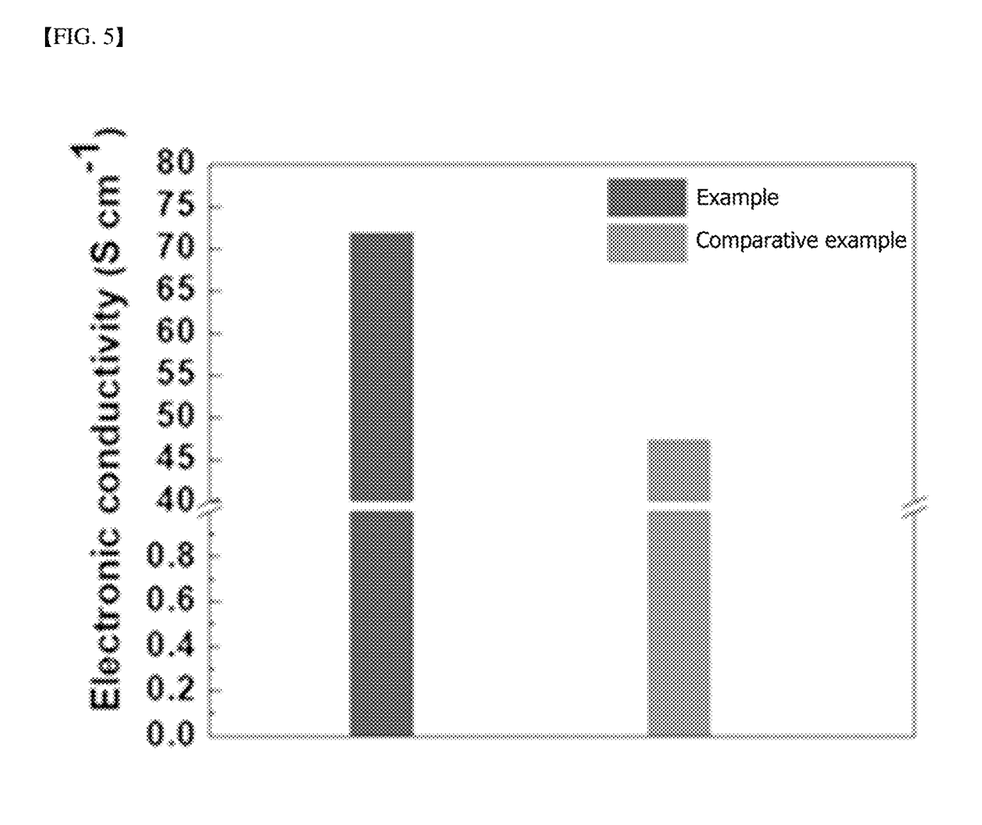
FIG. 5 shows a result of comparing electron conductivities of a three-dimensional structure electrode according to an embodiment of the present invention and an electrode prepared by comparative example 1.

Specifically, the electronic conductivity was measured by measuring the surface resistance using the 4 probe tip of Dasol ENG Co., Ltd., and results according to the examples and comparative examples are recorded in FIG. 5.

According to FIG. 5, in comparison with Comparative Example 1 in which an electron conductivity of 47.5 S/cm was recorded, the electrode of the example showed a numerical increase of about 6 times to 72.0 S/cm. Through this, since the electrode of the embodiment has a high electron conductivity, it can be used as an electrode without a separate current collector, and it can be inferred that the output characteristics of the battery including the same can also be improved.

Experimental Example 3: Evaluation of Cycle Characteristics

Figure 6:
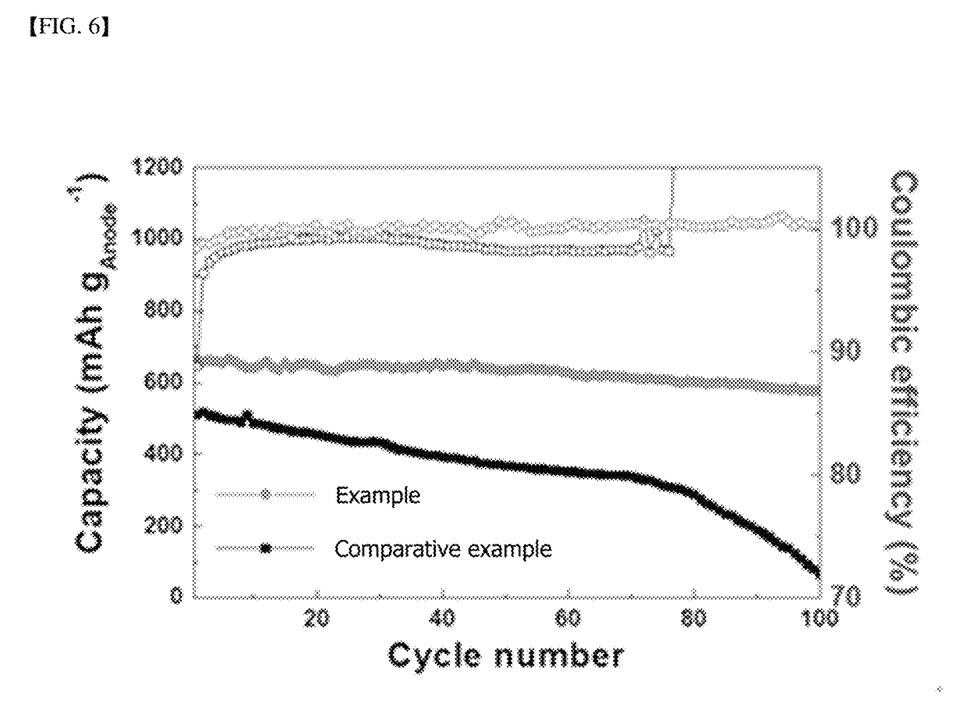
FIG. 6 is a graph showing the charge and discharge cycle life characteristics of a battery according to an embodiment and a comparative example of the present invention.

The batteries produced in the above Examples and Comparative Examples were first charged at 25° C. with a constant current (CC) of 0.2 C until becoming 0.01 V. Thereafter, the battery was discharged until it reached 1.2V at a constant current (CC) of 0.2 C. This was repeated in 1 to 100 cycles to observe the degree of degeneration of the discharge capacity. The result is shown in FIG. 6.

The battery of Examples showed excellent cycle characteristics compared to the battery of the Comparative Example. This may be because the active material is detached from the electrode due to the volume change of the active material in the electrode disclosed in the comparative example, and the electron conductive network is disconnected.

On the other hand, even if an active material having a large volume change is applied to the electrode of the embodiment by the upper and lower conductive layers, the electrode can maintain the electron conductive network and prevent the active material detachment.

In addition, through this, it is possible to provide an electrochemical device having high energy density and high output characteristics and excellent cycle performance.

It will be understood by those skilled in the art that various changes in form and details may be made therein without departing from the spirit and scope of the invention as defined by the appended claims.

DESCRIPTION OF REFERENCE NUMERALS

10: polymer fiber
20: active material particle
30: conductive material
100: three-dimensional structure electrode
110: active material layer
120: upper conductive layer
130: lower conductive layer

The invention claimed is:

1. A method for manufacturing an electrode having a three-dimensional structure, the method comprising:
   (a) preparing a polymer solution including a polymer and a solvent;
   (b) preparing a first colloidal solution including a conductive material, a dispersant, and a dispersion medium;
   (c) preparing a second colloidal solution including the conductive material, the dispersant, the dispersion medium, and active material particles;
   (d) preparing three-dimensional structure fibers using the polymer solution, the first colloidal solution, and the second colloidal solution; and
   (e) compressing the three-dimensional structure fibers,
   wherein step (d) comprises:
   simultaneously spinning the polymer solution and a first portion of the first colloidal solution to prepare a lower conductive layer;
   simultaneously spinning the polymer solution and the second colloidal solution on top of the lower conductive layer to prepare an active material layer; and
   simultaneously spinning the polymer solution and a second portion of the first colloidal solution on top of the active material layer to prepare an upper conductive layer,
   wherein the upper conductive layer and the lower conductive layer each have a porosity that is smaller than a porosity of the active material layer.

2. The method of claim 1, wherein step (d) is performed by using one method selected from the group consisting of: double electrospinning, double electrospray, double spray, and combinations thereof.

3. The method of claim 1, wherein during step (d), a spinning rate of the polymer solution is 2 to 15 µl/min, and wherein a spinning rate of the first and second portions of the first colloidal solution and the second colloidal solution is 30 to 300 µl/min.

4. The method of claim 1, wherein the first colloidal solution includes 0.1 to 50% by weight of the conductive material based on a total weight of the first colloidal solution.

5. The method of claim 1, wherein the polymer solution includes 5 to 30% by weight of the polymer based on a total weight of the polymer solution.

6. The method of claim 1, wherein step (c) comprises:
   injecting the conductive material into the active material particles to prepare a mixed powder;
   grinding the mixed powder to obtain a composite of the active material particles and the conductive material; and
   dispersing the composite within the dispersion medium to prepare the second colloidal solution.

7. The method of claim 1, wherein step (b) includes dispersing the conductive material within the dispersion medium to prepare the first colloidal solution.

* * * * *